United States Patent
Hemmes et al.

(10) Patent No.: US 6,322,916 B1
(45) Date of Patent: Nov. 27, 2001

(54) METHOD OF OPERATING A MOLTEN CARBONATE FUEL CELL, A FUEL CELL, A FUEL CELL STACK AND AN APPARATUS PROVIDED THEREWITH

(75) Inventors: Klaas Hemmes, Leiden; Gerhard Pieter Jan Dijkema, Voorburg, both of (NL)

(73) Assignee: Technische Universiteit Delft, Delft (NL)

( * ) Notice: Subject to any disclaimer, the term of this patent is extended or adjusted under 35 U.S.C. 154(b) by 0 days.

(21) Appl. No.: 09/242,747

(22) PCT Filed: Aug. 25, 1997

(86) PCT No.: PCT/NL97/00481

§ 371 Date: Nov. 17, 1999

§ 102(e) Date: Nov. 17, 1999

(87) PCT Pub. No.: WO98/08264

PCT Pub. Date: Feb. 26, 1998

(30) Foreign Application Priority Data

Aug. 23, 1996 (NL) .................................................. 1003862

(51) Int. Cl.$^7$ ..................................................... H07M 8/06
(52) U.S. Cl. .................................. 429/16; 429/17; 429/20
(58) Field of Search ................................... 429/16, 17, 20

(56) References Cited

U.S. PATENT DOCUMENTS

| | | | |
|---|---|---|---|
| 4,522,894 | * | 6/1985 | Hwang et al. . |
| 4,643,955 | * | 2/1987 | Smith et al. . |
| 4,650,727 | * | 3/1987 | Vanderborgh et al. . |
| 4,650,728 | * | 3/1987 | Matsumura et al. ............... 429/17 X |
| 5,094,926 | * | 3/1992 | Kobayashi et al. ..................... 429/20 |
| 5,232,792 | * | 8/1993 | Reznikov . |
| 5,346,779 | * | 9/1994 | Nakazawa ........................... 429/20 X |
| 5,397,656 | * | 3/1995 | Morimoto et al. ..................... 429/17 |
| 5,554,453 | * | 9/1996 | Steinfeld et al. ..................... 429/17 |

FOREIGN PATENT DOCUMENTS

| | | | |
|---|---|---|---|
| 3927729 | * | 2/1991 | (DE) . |
| 61727 | * | 10/1982 | (EP) . |
| 575883 | * | 12/1993 | (EP) . |
| 668622 | * | 8/1995 | (EP) . |
| 790657 | * | 8/1997 | (EP) . |
| 61-133566 | * | 6/1986 | (JP) . |
| 63-248076 | * | 10/1988 | (JP) . |
| 1-186570 | * | 7/1989 | (JP) . |
| 2-160603 | * | 6/1990 | (JP) . |
| 4-118863 | * | 9/1990 | (JP) . |

OTHER PUBLICATIONS

Minh "Technological Status of Nickel Oxide Cathodes in Molten Carbonate Fuel Cells—A Review" J. Of Power Sources v. 24, p. 1–19, Aug. 1988.*

* cited by examiner

Primary Examiner—Stephen Kalafut
(74) Attorney, Agent, or Firm—Pitney, Hardin, Kipp & Szuch LLP

(57) ABSTRACT

A method of operating a molten carbonate fuel cell having an anode and a cathode and in between a matrix comprising molten carbonate. Carbon dioxide is introduced into the matrix at a distance from the cathode. This greatly reduces the cathode's deterioration and in the system design increases the control potential of the fuel cell. A fuel cell or a fuel cell stack using said method. Method of generating electricity in a fuel cell, wherein water and carbonaceous material are heated at high temperature, yielding hydrogenous gas for the anode. The hydrogenous depleted gas from the anode is supplied with oxygenous gas and at least partially oxidized, producing heat for heat exchange with the water and carbonaceous material. Installation comprising a reform unit and a fuel cell using said method.

12 Claims, 4 Drawing Sheets

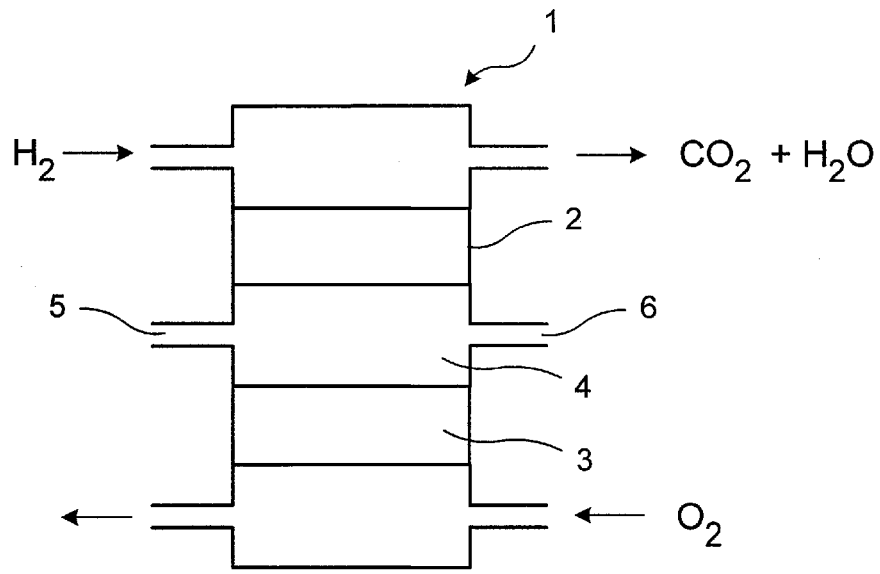
F I G. 1
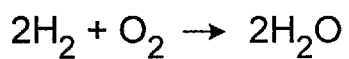
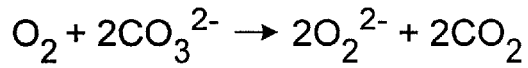
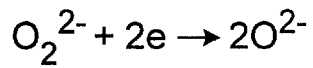
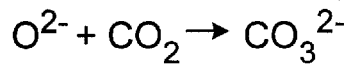
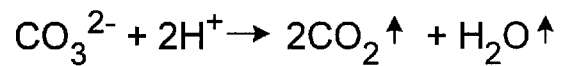
F I G. 1A

METHOD OF OPERATING A MOLTEN CARBONATE FUEL CELL, A FUEL CELL, A FUEL CELL STACK AND AN APPARATUS PROVIDED THEREWITH

The present invention relates to a method of operating a molten carbonate fuel cell, which fuel cell comprises a porous anode, a carbonate-comprising matrix and a porous cathode, wherein the anode is supplied with a hydrogenous gas and the cathode is supplied with a oxygenous gas and primary carbon dioxide, the fuel cell is operated at an elevated temperature, with the carbonate of the carbonate-comprising matrix being in a liquid state, oxygen and carbon dioxide are reacted at the cathode, yielding carbonate ions which move from the cathode to the anode generating an electric voltage between the anode and the cathode, and water that has been formed is led away from the fuel cell together with carbon dioxide.

Such a method is well-known in the prior art. In said method hydrogen, often in the form of coal gas (a mixture of predominantly hydrogen and carbon monoxide) or reform gas (a mixture of predominantly hydrogen and carbon dioxide) is supplied to the anode. Hydrogen donates electrons to the anode. The cathode is supplied with a mixture of oxygen and primary carbon dioxide, usually carbon dioxide-enriched air (70% air: 30% $CO_2$). The electrons donated by the hydrogen are accepted by the oxygen. Thus electric energy is generated. The overall reaction taking place in the fuel cell (equation 1 of the formula sheet) is purely a reaction between hydrogen and oxygen forming water. However, in a molten carbonate fuel cell, carbon dioxide plays a role as mediator taking care of the oxygen transport in the fuel cell. To this end primary carbon dioxide is supplied to the cathode. The cathode is often made from porous catalyst material such as nickel oxide (NiO). Under the conditions prevailing during the operation of the fuel cell, 650° C., and an environment containing aggressive carbonate ions, said cathode slowly but surely dissolves. The heat capacity of the mixture comprising remaining oxygen and carbon dioxide being led along the cathode is utilized, for instance, by using a turbine to generate additional electric energy. A portion of the mixture is subsequently supplemented with air and primary carbon dioxide and returned to the cathode. To do this, a cost-raising circulation system and a $CO_2$-recuperation system is required.

It is the objective of the present invention to provide a method according to the preamble, in which the cathode is better protected against the effect of carbonate ions and the life of the fuel cell is prolonged. In addition, a further objective of the invention is to eliminate the need for a circulation system. Further objectives will become clear from the following description.

SUMMARY OF THE INVENTION

The objectives according to the invention are realized by a method according to the preamble which is characterized in that the carbonate-comprising matrix is provided with a channel and via said channel primary carbon dioxide-comprising gas is introduced into the carbonate-comprising matrix at a distance from the cathode.

By keeping the carbon dioxide supply at a distance from the cathode, the environment near the cathode is a less detrimental one. Moreover, the low $CO_2$ tension prevailing near the cathode in accordance with the invention, promotes an important partial reaction, as will be explained below, which is favourable for the performance of the fuel cell.

JP 63.248 076 describes a method of preventing gas leakage from a fuel cell by placing said fuel cell in a pressure container. $CO_2$ gas is used as a pressurizing gas and the pressure in the pressure container is slightly higher than the operating pressure of the stack. Mention is made that $CO_2$ gas leaked into the stack supplements $CO_2$ gas consumed at the cathode, decreasing the voltage drop in the cell.

The present invention also relates to a fuel cell of the molten carbonate kind, which fuel cell possesses a porous anode, a porous cathode and a carbonate-comprising matrix placed between the porous anode and the porous cathode, having at the anode side an inlet for a hydrogenous gas and an outlet for reaction products and unused gas and at the cathode side an inlet for oxygenous gas and an outlet for unused gas.

To apply the method according to the invention in a fuel cell of this kind said fuel cell is characterized in that the carbonate-comprising matrix is provided with a channel for the supply of primary carbon dioxide-containing gas and for the distribution of the primary carbon dioxide-containing gas over the carbonate-comprising matrix.

Thus an installation is provided which allows the supply of carbon dioxide in the vicinity of, yet at a distance from the cathode. In addition the installation provides more extensive possibilities for the control of the streams to be supplied, so that the design of the installation may be better suited to the operational conditions in an industrial environment, such as the available fuel stream.

According to a preferred embodiment the supply and distribution channel is provided with an outlet for excess carbon dioxide gas.

An installation of this kind is suitable for the utilization of heat produced by the fuel cell by means of the carbon dioxide-containing gas as cooling agent.

Finally, the present invention relates to a fuel cell stack comprising at least two stacked fuel cells, each fuel cell having inlet openings for the supply of hydrogen to the anode and for the supply of oxygen to the cathode, respectively having discharge openings for non-reacted hydrogen and oxygen and water that has been formed and the inlet openings for hydrogen being aligned to form a supply conduit for hydrogen, the inlet openings for oxygen being aligned to form a supply conduit for oxygen respectively the outlet openings being aligned to form the respective discharge conduits.

A fuel cell stack of this kind is generally known in the art. In said fuel cell stack the cathode and the anode of successive fuel cells are separated by means of a separator plate made, for instance, from stainless steel. By means of such a fuel cell stack a greater capacity can be achieved, respectively connecting the individual fuel cells in series will result in a higher voltage.

According to the invention such a fuel cell stack is characterized in that each fuel cell has an inlet opening for the supply of carbon dioxide and an outlet opening for the discharge of non-reacted carbon dioxide, and the carbon dioxide inlet openings are aligned to form a carbon dioxide supply conduit and the carbon dioxide outlet openings are aligned to form a carbon dioxide discharge conduit.

In this manner a simply constructed fuel cell stack is provided by means of which carbon dioxide can be sup5 plied to the fuel cell installation.

The invention further relates to a method of generating electricity with the aid of a fuel cell possessing an anode and a cathode, wherein water and a carbonaceous material are heated at a high temperature by means of heat exchange, yielding a hydrogenous gas, the hydrogenous gas is supplied to the anode of the fuel cell and the oxygenous gas is supplied to the cathode of the fuel cell yielding electricity and a hydrogen-depleted gas stream, the hydrogen-depleted gas stream is supplied with an oxygenous gas and the hydrogen-depleted oxygenous gas stream is at least partially oxidized producing heat, which heat is utilized to heat the water and the carbonaceous material by means of heat exchange.

The method according to the invention thus provides a simple method of forming a hydrogenous gas mixture from a fuel which, in itself, is not suitable for the fuel cell. The particular advantage herein is also that the processes for the formation of hydrogen and the generation of electricity take place at substantially the same temperature, while the temperature of the gas stream from the anode needs to be raised only moderately to achieve good heat transfer—preferably taking place in counter-flow—to water and carbonaceous material. The method is at least partially of a self-regulating nature, which simplifies the control of the method and the installation necessary for the application of the method.

BRIEF DESCRIPTION OF THE DRAWINGS

The invention will now be elucidated with reference to the detailed description below and the drawing, in which FIG. 1 shows a schematic cross section of a molten carbonate fuel cell;

FIG. 1A sets forth a formulae sheet.

DETAILED DESCRIPTION OF THE DRAWINGS

Figure 2:
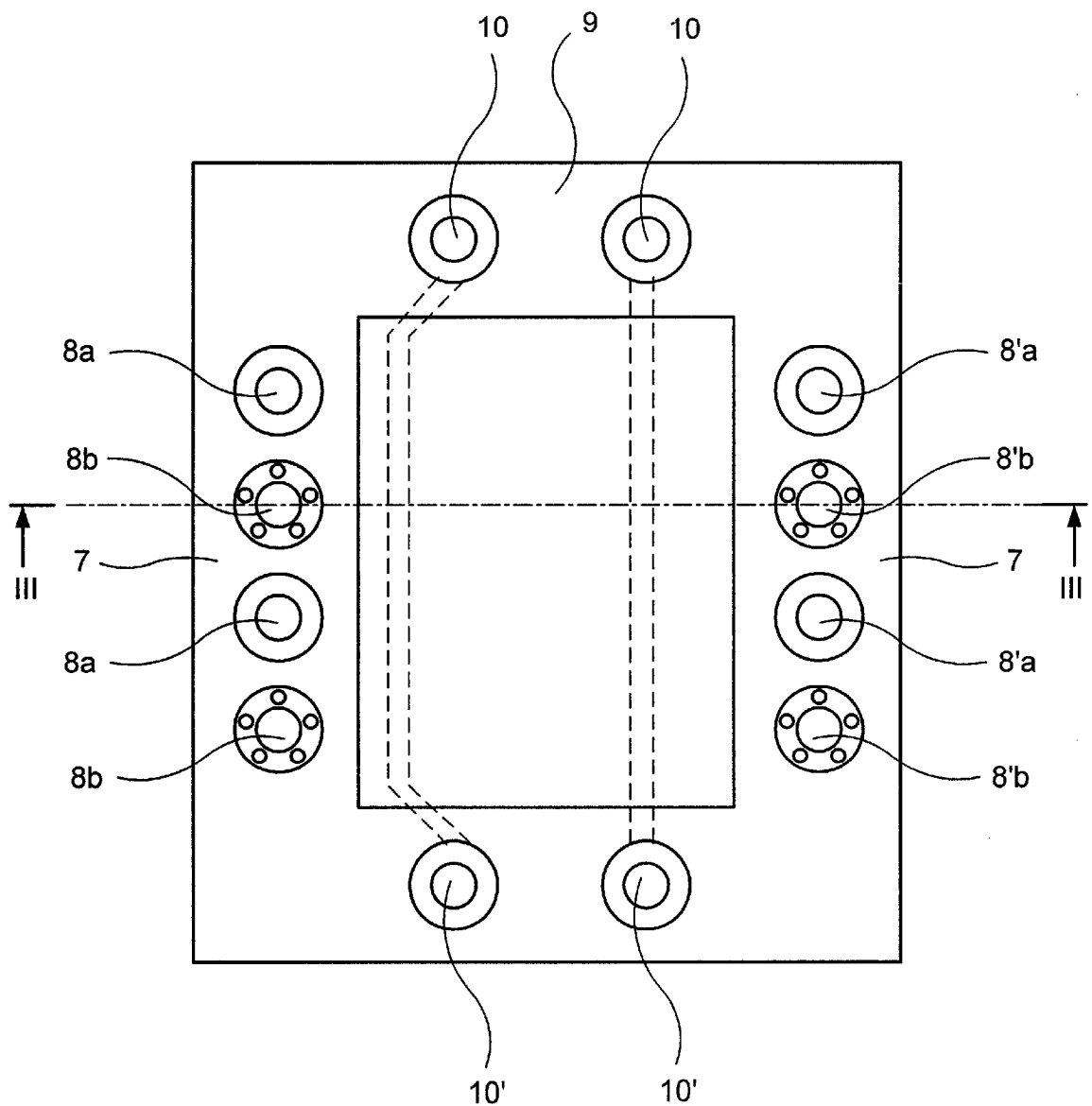
FIG. 2 shows an embodiment of a fuel cell installation according to the invention.

In the present application the term primary carbon dioxide means carbon dioxide for the enrichment of an oxygenous respectively a hydrogenous gas stream, that is to say it provides $CO_2$ to raise the $CO_2$ concentration naturally present in air or that are present after the usual preparation of a hydrogenous gas stream for fuel cells, in order to supply the fuel cell with the amount of $CO_2$ necessary for its proper operation. Therefore this term does not comprise the carbon dioxide which i) is already present in the hydrogenous gas stream directly after the generation of hydrogen, respectively ii) which is present in the oxygenous gas stream as, for instance, the carbon dioxide naturally present in air.

FIG. 1 schematically shows the construction of a molten carbonate fuel cell 1. The molten carbonate fuel cell consists roughly speaking of a porous anode 2, a porous cathode 3 and, provided between the anode 2 and cathode 3, a carbonate-comprising matrix 4 functioning as electrolyte and formed by molten carbonate. This molten carbonate—the carbonate melt—penetrates the porous anode and cathode.

In a molten carbonate fuel cell many partial reaction occur which eventually result in the reaction of hydrogen with oxygen, producing water. A little more precisely, oxygen supplied to the cathode 3 reacts with carbonate producing, for instance, peroxide, whereby $CO_2$ is released (reaction equation 2 of the formula sheet). At the surface of the cathode 3 the peroxide is reduced to $O^{2-}$ (reaction equation 3). It is $O^{2-}$ which reacts with $CO_2$ to form $CO_3^{2-}$. This causes the formation of carbonate ions at the cathode 3.

The present invention is based on the realization that for the reaction according to reaction equation 2 it is an advantage if the $CO_2$ concentration is low. According to the invention therefore, primary carbon dioxide is introduced into the carbonate-comprising matrix 4 at a distance from the cathode 3. This measure results in the $CO_2$ concentration being much lower at the cathode 3 than with the known method This promotes the production of peroxide (equation 2), and after the reaction of peroxide to $O^{2-}$ (equation 3) this latter ion reacts in the carbonate meltage with the $CO_2$ present therein (equation 4). According to the invention, this $CO_2$ comes from the matrix 4. The facilitated formation of peroxide means a reduction in the electrochemical polarization losses, which contributes to an increase in the performance of the fuel cell.

According to the invention, the percentage of primary carbon dioxide supplied to the fuel cell 1 at a distance from the cathode 3 is, in relation to the amount that is required to compensate $CO_2$ losses from the fuel cell 1, which compensation is necessary to ensure proper and continuous functioning, usually at least 20%, preferably at least 40%, more preferably at least 60%, especially at least 80% and most preferably at least 90%.

There are two different deterioration processes, deterioration caused by acid and base, which may corrode the cathode 3 [Ref. 1]. When operating the fuel cell in accordance with the prior art, the $CO_2$ concentration is high, so that the cathode 3, usually made of nickel oxide, corrodes due to acid deterioration. With the method according to the invention, primary carbon dioxide is introduced mainly at a distance from the cathode 3, so that the $CO_2$ concentration may be reduced considerably and damage to the cathode 3 may be limited It is possible to adjust the $CO_2$ concentration in the cathode gas such that the deterioration of the cathode 3 is minimal. This prolongs the life of the cathode 3 and consequently that of the fuel cell 1 According to an advantageous embodiment air is supplied to the cathode 3 with a slight partial carbon dioxide pressure ($10^{-4}$–$10^{-1}$ atm), thereby preventing in a simple manner that the cathode 3 suffers alkaline deterioration [Ref. 1].

Although it is possible to add primary carbon dioxide to the hydrogenous gas stream, an advantageous embodiment is characterized in that the primary carbon dioxide is introduced into the carbonate-comprising matrix 4 in the vicinity of the cathode 3. Therefore, introduction occurs directly into the carbonate-comprising matrix 4 and not via the porous anode 2. To this end the fuel cell 1 according to the invention is provided with an inlet opening for carbon dioxide-comprising gas If desired, this carbon dioxide-comprising gas may be, at least virtually, pure carbon dioxide or carbon dioxide-containing, hydrogen-depleted gas from the anode 2. If gas is used containing excess carbon dioxide or impure carbon dioxide, the fuel cell 1 will also possess an outlet opening 6. Gas discharged via said outlet opening 6 may advantageously be used to cool the fuel cell installation and the heat capacity may be utilized in a manner known in itself.

To reuse $CO_2$, there is no longer any need for oxygen- and carbon dioxide-containing mixture which has passed the cathode 3 to be returned to the cathode 3 because of the low $CO_2$ concentration, and the mixture may, after utilization of its heat capacity, be released into the atmosphere. Now that a recirculation apparatus has become obsolete, the method according to the invention significantly economizes in peripheral installations required for the operation of a molten carbonate fuel cell 1.

If carbon dioxide is discharged via the outlet opening 6 it will be desirable to reuse said carbon dioxide. If it is returned via inlet opening 5, the necessary recirculation device is much smaller than when cathode gas is recirculated (air comprises large amounts of nitrogen).

Instead, with regard to the supply of carbon dioxide via inlet 5, the fuel cell 1 may be operated in a so-called dead-end mode. This embodiment is advantageous when the gas to be supplied to the anode 2 is carbon dioxide-containing gas, with carbon dioxide-containing gas from the anode 2 being supplied to the matrix 4 via inlet 5. This allows the above-mentioned recirculation device to become completely obsolete.

Advantageously the fuel cell 1 is housed in a pressure vessel containing carbon dioxide-comprising gas. In such a situation the inlet 5 may be in open communication with the interior of the pressure vessel.

Stacking of fuel cells by means of internal gas supply and distribution (internal manifolding) is known in the prior art [Ref. 2]. Each cell is then separated by a separator plate to avoid that oxygenous gas and hydrogenous gas are mixed. In the embodiment shown, each cell 6 is rectangular and is provided at two opposite longitudinal sides 7 with openings 8a,b (outlet openings are indicated by an accent) for the supply of the respective gasses. The openings 8 of the stacked cells connect to each other so that they form conduits for the supply and discharge of gas (8a for hydrogenous gas, 8b for oxygenous gas). According to a first embodiment of the installation according to the invention, the series openings 8a, b includes a third kind of opening via which carbon dioxide can be supplied to the matrix. According to a favourable embodiment of the fuel cell installation in accordance with the invention, carbon dioxide is directly supplied to the carbonate-comprising matrix 4 via similar openings provided in the sides 9 extending perpendicularly to the longitudinal sides 7 for the supply (10) and discharge (10') of carbon dioxide-comprising gas. For this purpose the carbonate-comprising matrix 4 possesses at least one channel 11 connecting supply 10 and discharge 10' (indicated by the broken lines), through which channel 11 primary carbon dioxide-comprising gas is supplied to the carbonate-comprising matrix 4. Of course, it is also possible to provide the matrix 4 with channels 11 with external gas supply and distribution (external manifolding) (not shown).

When using carbon dioxide-containing, hydrogenous gas to be supplied to the anode 2, it is advantageous to use at least part of the carbon dioxide-containing, hydrogen-depleted gas coming from the anode 2 as the carbon dioxide-containing gas to be introduced into the matrix at a distance from the cathode.

Figure 3:
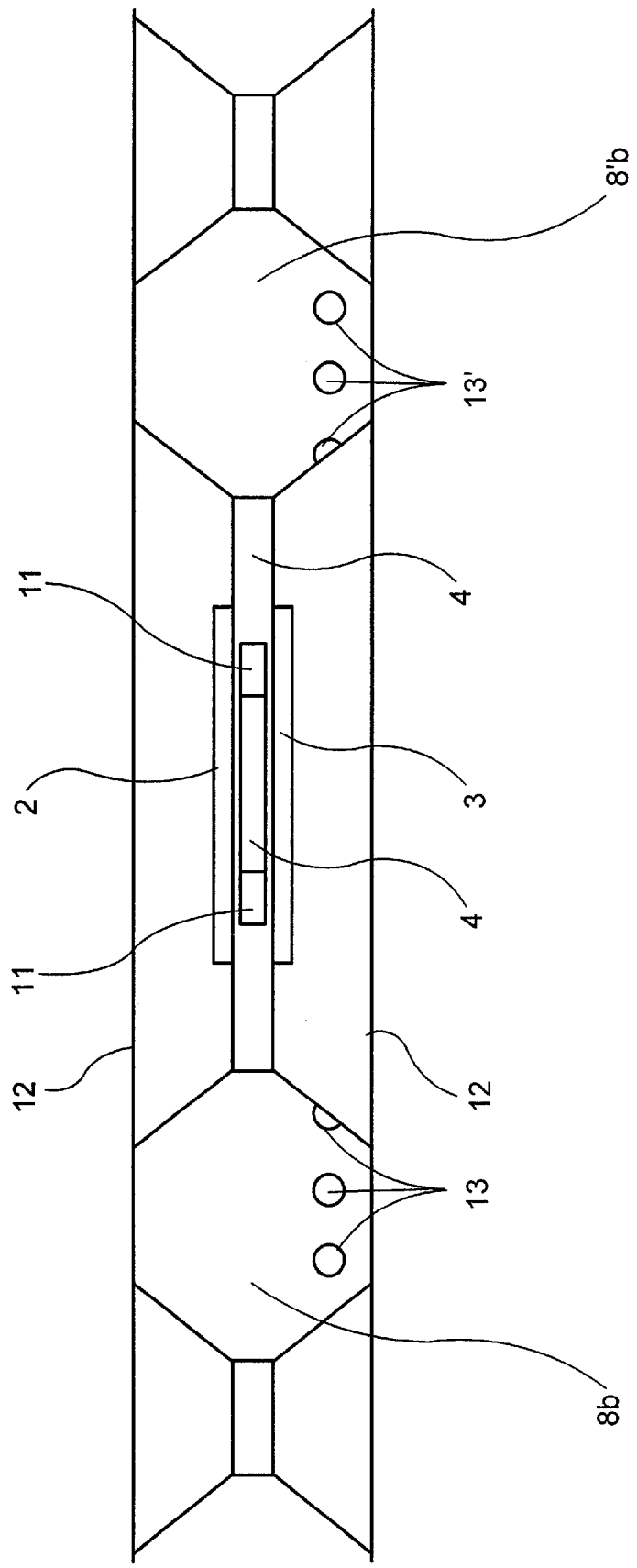
FIG. 3 shows a schematic cross section according to line III—III of FIG. 2.

FIG. 3 is a cross-sectional view of a fuel cell which is protected at both sides by means of separator plates 12. These may be made from, for instance, stainless steel. To operate the fuel cell, the separator plates are pressed against the anode 2 and cathode 3 for electric contact. FIG. 3 also shows how oxygenous gas can be conducted via the holes 13 over the cathode 3 and how excess gas can be discharged via openings 13'. The matrix 4 is provided with channels 11. In practice there will be more than the two shown here The construction shown in FIG. 3 may, for instance, be realized by placing spaced strips of matrix material onto a plate of matrix material and covering this with a second plate of matrix material.

The amount of primary carbon dioxide introduced at a distance from the cathode will depend on the fuel that is used. If the fuel is, virtually anyway, pure hydrogen coming, for instance, from an industrial process stream, the percentage primary carbon dioxide will be high. If a carbon dioxide-containing fuel stream is used, for instance reform gas, the percentage of primary carbon dioxide will be at least lot of the total amount of carbon dioxide supplied to the fuel cell.

The present invention offers an extra degree of freedom with respect to design and operation of a molten carbonate fuel cell system. It will be clear to the person skilled in the art that within the scope of the invention many variations are possible For instance, the fuel cell may be operated under pressure and the expert is able to determine at which carbon dioxide concentrations the cathode 3 will suffer the least corrosion. In a fuel cell stack the supply and discharge conduits for hydrogen and oxygen, respectively for non-reacted hydrogen and oxygen and reaction products may be located at two opposite longitudinal sides, while the supply conduit for carbon dioxide and the discharge conduit for non-reacted carbon dioxide are located at two longitudinal sides connecting the first two longitudinal sides, as shown in FIG. 3, but it is, for instance, also possible to distribute all supply and discharge openings over two opposite longitudinal sides.

Figure 4:
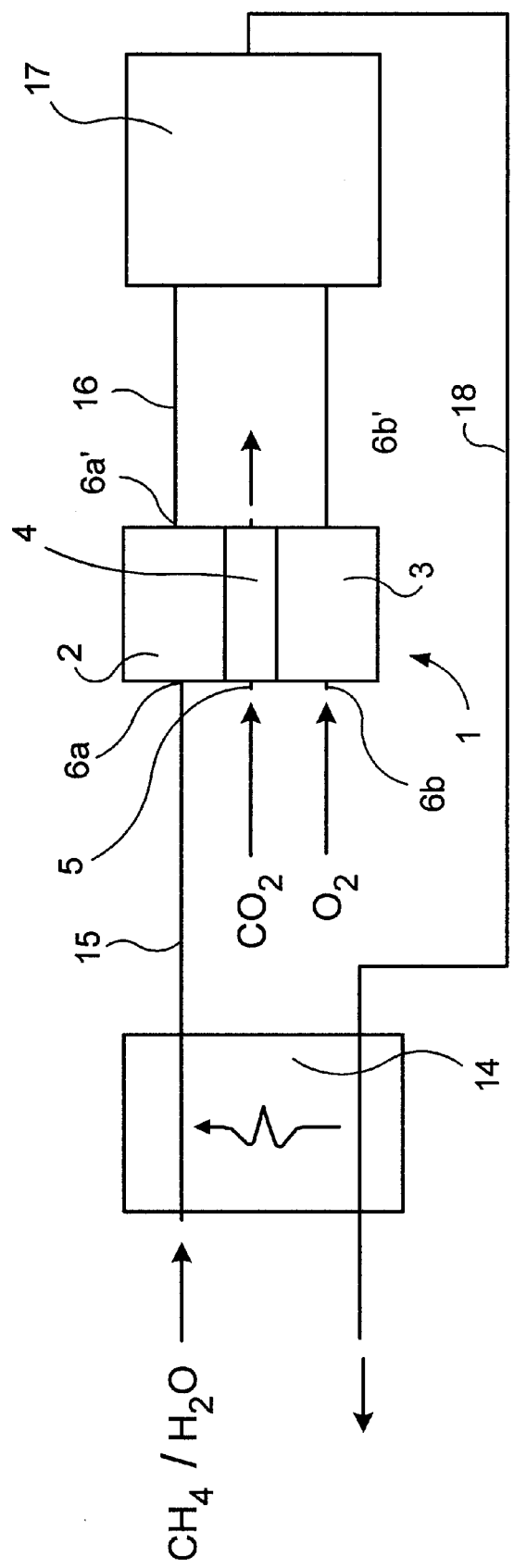
FIG. 4 schematically shows an installation in which gas which is to be supplied to a fuel cell, is pretreated.

The fuel cell according to the invention may very advantageously be applied in an installation for the generation of electricity using a primary fuel other than hydrogen. FIG. 4 shows such an installation in which previously mentioned parts are indicated by the same reference numbers. The installation comprises a reform unit 14 heated by means of heat exchange, to which are added i) a carbonaceous material such as coal, and according to a favourable embodiment a hydrocarbon compound, such as methane, and ii) water, for instance, in the form of steam. The mol ratio carbon to water may be, for instance, 2:3. In the reform unit 14 the hydrocarbon compound is converted at a raised temperature yielding a gas mixture comprising hydrogen and carbon monoxide. The gas mixture is supplied to the anode 2 via a conduit 15. After the gas mixture has passed the fuel cell 1, it is hydrogen-depleted but still combustible. Said still combustible gas mixture is supplied to a secondary reform unit 17, via a conduit 16. To said secondary reform unit 17 there is also supplied an oxygenous gas. Said oxygenous gas may be oxygen-depleted gas from the cathode 3 (as shown), or oxygenous gas, such as air or pure oxygen, which is supplied directly to the secondary reform unit 17. The combustible components of the gas mixture from the fuel cell 1 are at least partially oxidized in the secondary reform unit 17, producing heat. A conduit 18 conducts said heat to the reform unit 14 where the heat, by means of heat exchange, preferably in counter-flow, is supplied to the gas mixture comprising a hydrocarbon and water. This embodiment is particularly favourable, as the reform temperature is substantially equivalent to the operational temperature of the fuel cell 1. The actual temperature depends, among other things, on the hydrocarbon compound used and the pressure applied (usually between 1 and 30 atmospheres), and ranges generally from between 600 and 900° C. Depending on the desired compactness of the installation and the desired energy output, a pressure is selected in accordance with a given operational temperature of the fuel cell 1.

Thus an installation is provided for the effective utilization of a hydrocarbon compound as fuel for a fuel cell. By using the fuel cell according to the invention it is possible to use oxygen-depleted gas from the cathode 3, because said gas does not comprise the large portion of carbon dioxide according to the prior art, which would hinder the attainment of a sufficiently high temperature in the secondary reform unit 17 to allow operation of the reform unit 14 by means of heat exchange. In addition, total utilization of the energy capacity of the hydrocarbon compound is ensured. According to the prior art the oxygenous gas is supplied to the cathode in order to control the temperature management of the fuel cell 1. According to the present invention the carbon dioxide-comprising stream can be used to control the temperature management, while independently thereof the supply of oxygen to the cathode 3 can be optimized to achieve the desired conversion in the fuel cell 1 and a desirable amount of oxygen in the secondary reformer 17 for the generation of heat.

The installation according to the invention is characterized by a certain self-regulating nature. If little hydrogen is formed when starting up the installation, heat development in the secondary reform unit 17 will be greater, so that more heat will be transferred to the reform unit 14 and hydrogen production is promoted.

The gas formed by partial oxidation in the secondary reform unit 17 may, after cooling in the reform unit 14, be put to a variety of uses. For instance, it may be used as carbon dioxide-comprising gas intended for supply to the matrix 4 of the fuel cell 1. Since it is only necessary to supply sufficient oxygen to the secondary reform unit 17 to guarantee the availability of enough heat to maintain conversion in the reform unit 14, it is possible to form a hydrogenous and carbon monoxide-containing gas that may be used as starting substance for syntheses. optionally, said gas may be added to a reactor to change the ratio of hydrogen, carbon monoxide and carbon dioxide. If the hydrogen portion is increased, it may be supplied to a second fuel cell, with an optional gas separation over a membrane.

REFERENCES

[1] J. D. Doyon, T. Gilbert, J. Davies. NiO solubility in mixed alkali/alkaline earth carbonates. J. Electrochem. Soc 134 (12), pp. 3035–3038 (1987).

[2] S. Sato. Development of internal manifolding stack Proceedings of the second symposium on Molten Carbonate fuel cell Technology. Red. J. R. Selman et al. The Electrochem. Soc. proceedings PV 90–16, pp. 137–156 (1990).

What is claimed is:

1. A method of operating a molten carbonate fuel cell, which fuel cell comprises a porous anode, a carbonate-comprising matrix and a porous cathode, wherein the anode is supplied with a hydrogenous gas and the cathode is supplied with a mixture of an oxygenous gas and a primary carbon dioxide, the fuel cell is operated at a temperature in a range of approximately 600° C. and above, with the carbonate of the carbonate-comprising matrix being in a fluid state, oxygen and carbon dioxide are reacted at the cathode, yielding carbonate ions which move from the cathode to the anode generating an electric voltage between the anode and the cathode, and water that has been formed is led away from the fuel cell together with carbon dioxide, characterized in that the carbonate-comprising matrix is provided with a channel and via said channel primary carbon dioxide-comprising gas is introduced into the carbonate-comprising matrix at a distance from the cathode.

2. A method of operating a molten carbonate fuel cell according to claim 1, characterized in that the primary carbon dioxide is introduced into the carbonate-comprising matrix at the cathode.

3. A method of operating a molten carbonate fuel cell according to claim 1, characterized in that the primary carbon dioxide-comprising gas is discharged from the fuel cell and its heat capacity is utilized.

4. A method according to claim 1 characterized in that at least 10% of the carbon dioxide is introduced into the carbonate-comprising matrix at a distance from the cathode.

5. A method according to claim 1 characterized in that the mixture supplied to the cathode is an oxygenous gas and carbon-dioxide-comprising mixture whose carbon dioxide concentration is adjusted such as to minimize the damage to the cathode caused by molten carbonate.

6. A method according to claim 5, characterized in that the cathode is a nickel oxide cathode and the partial carbon dioxide pressure in the oxygenous and carbon dioxide-comprising mixture is ($10^{-4}$–$10^{-1}$ atm).

7. A fuel cell of the molten carbonate kind, which fuel cell possesses a porous anode, a porous cathode and a carbonate-comprising matrix placed between the porous anode and the porous cathode, having at the anode side an inlet for a hydrogenous gas and an outlet for reaction products and unused gas and at the cathode side an inlet for oxygenous gas and an outlet for unused gas, characterized in that the carbonate-comprising matrix is provided with a channel for the supply of primary carbon dioxide-comprising gas and for the distribution of the primary carbon dioxide-comprising gas over the carbonate-comprising matrix.

8. A fuel cell according to claim 7, characterized in that the supply and distribution channel is provided with an outlet for excess carbon dioxide-comprising gas.

9. A fuel cell stack comprising at least two stacked fuel cells, each fuel cell having inlet openings for the supply of hydrogen to the anode and for the supply of oxygen to the cathode, respectively having discharge openings for non-reacted hydrogen and oxygen and water that has been formed and the inlet openings for hydrogen being aligned to form a supply conduit for hydrogen, the inlet openings for oxygen being aligned to form a supply conduit for oxygen respectively the outlet openings being aligned to form the respective discharge conduits, characterized in that each fuel cell has an inlet opening for the supply of carbon dioxide and an outlet opening for the discharge of non-reacted carbon dioxide, and the carbon dioxide inlet openings are aligned to form a carbon dioxide supply conduit and the carbon dioxide outlet openings are aligned to form a carbon dioxide discharge conduit.

10. A method of generating electricity with the aid of a fuel cell possessing an anode, a matrix and a cathode, wherein water and a carbonaceous material are heated at a temperature sufficient to yield a hydrogenous gas, the hydrogenous gas is supplied to the anode of the fuel cell and the oxygenous gas is supplied to the cathode of the fuel cell yielding electricity and a hydrogen-depleted gas stream, the hydrogen-depleted gas stream is supplied with an oxygenous gas and the hydrogen-depleted oxygenous gas stream is at least partially oxidized producing heat, which heat is utilized to heat the water and the carbonaceous material by means of heat exchange, wherein at least a part of the hydrogen-depleted stream or the gas stream obtained after partial oxidation is supplied to the matrix of the fuel cell.

11. A method according to claim 10, characterized in that as the carbonaceous material a hydrocarbon is used.

12. An installation for generating electricity, which installation comprises a primary reform unit and a fuel cell having a cathode and an anode, wherein the primary reform unit is connected with the anode of the fuel cell, characterized in that the primary reform unit is to be heated by means of heat exchange, at least the anode of the fuel cell is connected with a secondary reform unit having an inlet opening for oxygenous gas and said primary reform unit is arranged to at least partially oxidize hydrogen-depleted gas from the fuel cell, and wherein the secondary reform unit is connected with the primary reform unit for its heating by means of heat exchange.

* * * * *